United States Patent Office

3,294,564
Patented Dec. 27, 1966

3,294,564
PROCESS OF REACTING BLOOD PROTEINS WITH GLUTARALDEHYDE AND THE PRODUCT THEREOF
Sulo A. Karjala and Frank K. Dering, both of Chicago, Ill., assignors to Wilson & Co., Inc., a corporation of Delaware
No Drawing. Filed Feb. 25, 1966, Ser. No. 529,919
10 Claims. (Cl. 106—135)

This application is a continuation-in-part of application Serial No. 120,110 entitled, Method of Preparing Proteinaceous Agents and the Product Thereof, filed May 22, 1961, now abandoned.

This invention relates to glues. More particularly, it relates to novel proteinaceous agents useful in glue manufacture. Still more particularly, it relates to alkali-soluble materials which are derived from proteins and to a novel method of producing the materials.

The proteinaceous agents of this invention are products of reaction of proteins and the polyfunctional aldehyde, glutaraldehyde. The reaction product is useful alone or in combination with other known adhesive materials in the manufacture of alkaline glues for such uses as the uniting of wood veneers in the manufacture of plywood. The proteinaceous products are also useful in other diverse applications, such as paper board, press wood, etc.

Proteins of a number of different types have been used in the manufacture of glues. Vegetable proteins, such as soybean protein, and animal proteins, such as casein, animal blood proteins, etc., are used alone or in combination, in the preparation of commercial glues.

Animal blood proteins useful in the manufacture of glues are of two types, the so-called water-soluble bloods and the water-insoluble blood types, both of which are soluble in alkali. In water-soluble bloods, the protein solubility in water is ordinarily in the range of 80% to 100%.

Soluble or insoluble bloods may be prepared by dehydration, generally, of dried whole blood from which only a varying amount of the fibrin has been removed in processing, using drum dryers, spray dryers, etc.

Soluble bloods have the disadvantage of imparting low viscosity to aqueous alkaline solutions unless used in appreciable concentration with a resulting appreciable cost. Another disadvantage of the soluble bloods is that the alkaline glues prepared therefrom exhibit appreciable increasing viscosity change during the pot life of the glue.

Insoluble blood may be prepared by heating liquid blood to the coagulative point before drying, by drying at high temperatures and by subjecting dried soluble blood to heat. Heat treated products can be made so that they are water-insoluble, although possessing a high degree of alkali solubility and the ability to impart suitable viscosity characteristics to alkaline solutions. However, the heat denaturation processes have been difficult to control for uniformity in products and often produce products giving a wide variation in performance as evaluated as to pot life, spreadability and bonding characteristics. In order to alleviate the difficulties, the insoluble bloods have generally been used in admixture with other adhesive materials such as soybean flour, casein, etc.

Another form of proteinaceous material capable of developing high viscosity in alkaline glues has been prepared by the reaction of formaldehyde and other low molecular weight aldehydes possessing one reactive aldehyde group, with blood proteins. Formaldehyde-protein reaction products must be freshly prepared, i.e. the formaldehyde must be added to the freshly prepared aqueous glue, because the dry products are not stable in storage. Apparently the reaction of formaldehyde and proteins is not arrested when the reaction mixture is reduced to powder form. Glues prepared from stored formaldehyde-containing reaction products show that the longer the time of storage, the higher the viscosity of the glue product prepared therefrom with the result being after storage for periods usual in the trade, a viscosity too high for use in, for example, a glue for wood veneering, and viscosity increases which are irregular and unpredictable. The instability of the properties of the glues prepared from the protein-formaldehyde reaction products has limited the commercial utility of such products.

It has also been suggested that aldehydes or aldehyde precursors such as hexamethylene tetramine, acetals, etc., be added to prepared protein glues to react with the proteins in situ and to render the proteins insoluble in aqueous media. While this reaction between protein and an aldehyde reasonably could be expected to improve the water resistance of the finished glue, it has resulted in the production of glues whose characteristics are diffcult to control.

The potentially insoluble protein-aldehyde reaction products formed in situ in a glue are different from the products of this invention. Applicants' dry reaction products, while relatively water-insoluble, remain dissolvable in alkaline solutions, have adhesive properties when redissolved and impart to a glue an extended "pot life."

It has now been discovered that it is possible to prepare certain proteinaceous reaction products which are water-insoluble but have substantial solubility in alkaline glue mixtures. The reaction products impart to the glues a viscosity that is controllable within specific limits and maintain a reasonably uniform viscosity over a period of hours.

The method of preparing these proteinaceous products involves the reaction of proteins with the di-aldehyde glutaraldehyde in aqueous solution. In accordance with this invention, an aqueous solution of protein and glutaraldehyde is reacted under appropriate conditions of reactant concentrations, temperature and holding time and then the resultant composition is dehydrated under conditions to control denaturation of the proteins and to convert the water-soluble reaction product to a water-insoluble, alkali-soluble dry product.

Proteins useful in the preparation of the reaction product may be derived from vegetable or animal sources. Typical vegetable proteins are the aqueous extracts of defatted soya bean flour or peanut meal, etc. Animal blood proteins, because of the abundant supply, provide an excellent raw material. Bloods available in the greatest quantities are those from beef and hogs. Other bloods such as those of sheep, goats and horses may also be utilized. Any of the protein materials may be used alone or in admixture with other proteins. In this connection, it should be noted that proteins from different sources having varying compositions, i.e., contain, for example, greater or lesser quantities of the various amino acids such as lysine, and, consequently, will show variations in properties of the reaction product if identical processing conditions are adhered to. Beef blood, for example, yields a product of considerably higher viscosity than does hog blood for any given set of processing conditions. The properties of the reaction product are, therefore, subject to modification either through processing of mixtures of proteins or through variation of processing conditions. A protein starting material having beef and hog blood mixed in a weight ratio of between 1:1 and 2.5:1 is a typical example of a mixture of animal proteins. In the examples to follow, the starting materials for preparation of reaction products which can impart to the glue prepared therefrom a viscosity in the range between 5,000 and 25,000 centipoises, viscosity currently considered optimum for commercial glue spreaders, are hog blood, beef blood and mixtures of hog and beef bloods. A mixture of beef and hog blood of 2:1 ratio is commonly used, since it approximates the ratio of raw blood usually available from packing houses. However, different ratios of beef and hog blood may be used, depending on the desired viscosity to be imparted by the product.

The amount of glutaraldehyde necessary to yield a product giving suitable viscosity is also dependent to some extent on the quality of the blood obtained from the packing houses. Blood which has been allowed to stand for some time under warm conditions, as in the summer, may undergo bacterial degradation to an extent where considerably more glutaraldehyde is necessary in the reaction to obtain a product yielding desired viscosity.

The ability of the proteins from these various sources to react rapidly with glutaraldehyde apparently depends to an appreciable extent upon the degree of concentration. Fresh blood, which contains 15% to 20% blood solids, reconstituted soluble blood, and blood solids concentrated under conditions avoiding appreciable heat denaturation of protein, enter into the reaction with substantially equal facility. Bloods concentrated to between 30% and 35% have been preferred for preparation of products adapted to specific uses because use of higher concentration of solids in the reacted mixture reduced the cost of spray drying operations but, in general, preparation of products from unevaporated blood is the present trend.

Glutaraldehyde reacts with the proteins to produce reaction products which are relatively stable on storage, i.e., products stored six months do not impart appreciably greater viscosity to glues than the product would have imparted if used when only two weeks old. This characteristic distinguishes the protein-glutaraldehyde reaction product from products of proteins and formaldehyde. The amount of glutaraldehyde utilized in accordance with this invention varies from about 0.1% to about 2.4% of anhydrous glutaraldehyde based upon the weight of the protein or upon the weight of blood solids. Preferably, the amount of glutaraldehyde used for reaction with blood proteins is 0.6% to 1.0% when reacting with concentrated beef blood, between 1.2% and 2.2% when reacting concentrated hog blood and between 1.0% and 2.0% when reacting mixtures of beef and hog blood present in a ratio between about 1:1 and 2.5:1, which preferred range of glutaraldehyde is subject to shifting depending upon the relative proportions of beef and hog blood in the mixtures.

Glutaraldehyde is commercially available as relatively pure 25% and 50% solutions in water.

When glutaraldehyde is added to an aqueous protein solution, such as blood, an increase in viscosity of the aqueous mixture will be noted upon standing. If the concentrations of glutaraldehyde and blood solids are sufficiently high, the mixture may gel irreversibly if allowed to react for a sufficient period of time, and the dried reaction product will then be insoluble in alkaline solutions. To prevent formation of an irreversible gel and to avoid formation of insoluble material due to this cause, particularly when reacting the blood proteins with amounts of glutaraldehyde in excess of about 1.5%, processing conditions designed to minimize gelling are utilized, i.e., reaction at minimum temperature, at maximum reactant dilution, etc. In general, an aqueous reaction mixture showing a tendency to gel is subjected to agitation, is diluted with additional water, or both, to produce a free flowing pumpable solution for delivery to the dehydration step. In this process, the reactant mixture containing relatively large amounts of glutaraldehyde is dehydrated before appreciable amounts of irreversible gel are formed and under conditions to minimize formation of insolubles so that a major portion of the dry products are alkali soluble.

Blood entering into the reaction with glutaraldehyde may have a solids content in the range of about 12% to 35%. Dilute solutions of blood proteins of the order of 12% to 20% react, with any fixed amount of glutaraldehyde, at a markedly slower rate than the proteins of concentrated solutions. A blood protein solution of 18% solids concentration reacted with 1% glutaraldehyde added as a solution having a volume which is 50% the blood volume, may be held at room temperatures for a period in the range between 15 to 30 minutes to produce a reaction product capable of imparting a viscosity in the range of 10,000 to 80,000 centipoises to an alkaline solution. Dilute blood proteins solutions can be reacted at room temperature prior to drying for as long as 4 hours and still produce a reaction product capable of imparting a viscosity in the range of 10,000 to 80,000 centipoises to an alkaline solution, provided the glutaraldehyde content does not exceed about 1.0% and the volume of the glutaraldehyde solution added is equal to that of the blood solution. In contrast, a concentrated blood of about 32% solids, similarly reacted with 1% of glutaraldehyde requires only a 6 seconds reaction time in order for the reaction product to impart a viscosity in excess of 30,000 centipoises. Blood protein solutions of approximately 16-17% blood solids treated with the reagent dissolved in approximately 10% of the blood volume of water behave in much the same way as blood protein solutions of 32-34% blood solids treated with the reagent dissolved in a volume of water equal to that of the blood. In both cases the reaction time can be controlled by metering appropriate volumes of the reactants into a mixing chamber of sufficient capacity to allow contact of the reactants for the desired time before drying. Under certain conditions, as described below, the reactants can be mixed under conditions resulting in a blood solids concentration of over 15%, for example, approximately 20% blood solids, for a specified period of time, followed by dilution with sufficient water to yield a blood solids content of near 15% to slow down the reaction and drying the product in a spray dryer.

In order to provide a readily controllable reaction, particularly at the higher concentrations of blood proteins, and to avoid an insolubilizing type of reaction, the required amount of glutaraldehyde is generally added in the form of a water solution having a volume in the range between about 5% and about 100% of the volume of the blood solution, and preferably in the range between 5% and 10%. Inasmuch as the reaction of proteins and glutaraldehyde is markedly affected by the relative concentrations of proteins and glutaraldehyde in the reacting mixture, it may be desirable at times to introduce glutaraldehyde in a more dilute aqueous solution whose volume is greater relative to the volume of the blood solution. If the blood protein solution is a dilute one, glutaraldehyde can be added in a cncentrated form, i.e., 25% glutaraldehyde, without appreciable gelling of the mixture.

Reaction time, as explained before, is interrelated with concentration of reactants and temperature of reaction. For a given concentration of reactants and temperature for the reacting mixture, reaction time prior to drying is optimum within a rather narrow range. Reaction time is usually chosen to produce a reaction product with a desirable viscosity in alkaline solution measured by the hereinafter described test, generally a viscosity in the range of 10,000 to 80,000 centipoises. When lower viscosities are desired, it will be understood that the interrelated factors of concentration, temperature and amount of glutaraldheyde will be adjusted, for example, by using a lower concentration of glutaraldehyde in the blood since it is easier and more practical to modify the concentration of glutaraldehyde in the reacting liquid mixture.

When adding the same amount of glutaraldehyde to a concentrated blood in a volume equal to 10% of the blood volume, the reaction time necessary in order that the product will exhibit a viscosity in excess of 30,000 centipoises, will be of the order of 1 to 15 seconds and the reaction time prior to drying may not be extended beyond 30 seconds before the product will exhibit deleterious changes in viscosity in alkaline solutions.

When the reaction time is of such short duration as 1 to 2 seconds, the most satisfactory mixing procedure consists in metering the glutaraldehyde solution into a blood solution in a mixing zone or feed pipe of the dryer adapted to maintain turbulent conditions of liquid flow.

Although reaction products yielding appropriate viscosities in alkaline solution can be obtained with a reaction time of 1 to 2 seconds, there is a possibility of obtaining an inhomogeneous product due to the failure of the reactants to mix completely in this short a reaction time. To insure good mixing, an inline mixer of suitable volume to permit a preferred reaction time of 5 to 15 seconds is placed in the dryer feed line.

Another factor affecting the reaction of proteins and glutaraldehyde is temperature. At temperatures below about 110° F., for example, between 60° F. and 110° F., when using any fixed concentration of reactants, the time of reaction varies inversely with temperature, i.e., the higher the reaction temperature, the shorter the reaction time to obtain products imparting a viscosity of the same order of magnitude. At temperatures above 110° F., for example, at 120° F., the reaction is accelerated but the higher temperatures may effect heat denaturation of proteins unless the exposure to this temperature is of very short duration. Heat denaturation of the proteins must be avoided if a product of substantially complete solubility in alkaline solution is to be obtained, but a reaction product of partially denatured proteins has utility for some uses and, therefore, some denaturation may be tolerated.

The influence of temperature is minimized when the concentrations of blood and glutaraldehyde are such that an almost instantaneous reaction, i.e., 2 to 12 seconds is obtained. Under these conditions, a product producing viscosities of the same order of magnitude is obtained at a reaction temperature of 60° F. as is obtained at 110° F.

In general, the higher the reactant concentrations in the mixture and the higher the reacting temperature, the shorter the holding time required to produce a reaction product which will be soluble in alkalies at a temperature of about 70° F. and will impart a viscosity to glue in the range considered optimum for use in commercially available glue spreaders.

The reaction of glutaraldehyde and proteins when reactants are brought together initially as aqueous solutions, proceeds at a rapid rate as evidenced by a two to six second reaction time under such conditions as have been explained hereinbefore.

Following mixing, the protein-glutaraldehyde reaction product is reduced to a dry state by methods such as by evaporation of water through application of heat such as by spray drying. In such a dehydration step, the water-soluble reaction product is converted to a water-insoluble, alkali-soluble powdered product. When the dehydration of the reaction product is carried out, it must be recognized that the reaction between proteins and glutaraldehyde continues until the reaction mixture is relatively low in moisture content. Prior to attaining the necessary low moisture content, some heat denaturation of protein may occur. When the dehydration is carried out in, for example, a spray dryer, the temperature of the solids must not reach a point where the reaction product is rendered insoluble in alkaline solution. Appropriate drying conditions are generally maintained by limiting the temperature of the air leaving the dryer to a temperature of about 200° F. and preferably by maintaining the air outlet temperature at about 180° F. or lower.

The effect of higher temperatures in the dryer upon the viscosity imparted to alkaline solution by the reaction product may be counterbalanced by such changes in processing as a reduction in the holding time prior to drying and/or by reducing the glutaraldehyde content of the reacting mixture. If the air outlet temperature is increased to about 200° F., the glutaraldehyde content of the reacting mixture should preferably be reduced.

When the dehydration of the reaction product has been carried out and a dry product of relatively low moisture content is being produced with the dry solid product attaining elevated temperatures, the reaction of proteins and glutaraldehyde continues at a relatively rapid rate at the dryer temperatures in the presence of water, after which time the reaction continues at a relatively slow rate until reaction is substantially completed. This slow reaction is generally believed to continue for a short period after the product is delivered to storage since a temperature rise can be measured in packaged material during the first week of storage, following which the product cools to the ambient temperature.

After the reaction has gone to substantial completion, as evidenced by an increase in the viscosity in alkaline solution over that of the material at the time it was collected from the dryer, the product is stable and may be stored for periods of, for example, up to a year without deleterious further appreciation in viscosity.

On the other hand, if the viscosity of the reaction product in alkaline solution is less than desired, an increase in viscosity within a narrow range, can be attained without appreciable increase in insolubility due to denaturation of the proteins by subjecting dry products to temperatures generally of the order of 100° F. to 120° F. for varying periods of time as by holding the product for varying periods in storage at these elevated temperatures.

Products of this invention, to have utility in glues, must have appreciable solubility in alkaline solutions. Solubility of reaction products is determined by dispersing the material in water maintained at 70° F. to form a dispersion of 2.5% solids content. Sodium hydroxide in the amount of 0.1 grams per gram of blood-glutaraldehyde reaction product present in the dispersion is added and the mixture is agitated for 10 minutes. After 10 minutes, a portion of the mixture is centrifuged and aliquots of the centrifuged and uncentrifuged material are dried and weighed. The difference between the two weights, after subtraction of the known amount of alkali present, gives a measure of the amount which has been solubilized by the alkali.

When preparing products utilizing mixtures of hog and beef proteins, the substantially soluble reaction products showed 80% thereof or more, to be soluble in the alkaline solutions of the alkali concentration of the test. To qualify as a substantially soluble reaction product, 50% thereof or more, should be found in the alkaline solution of this concentration. It is to be recognized that this alkali solubility determination is only an analytical tool for characterizing and evaluating these blood protein compositions intended for use in glue and that at the alkali concentration actually used in the production of glue substantially all of a product showing 80% solubility in the above test, will be soluble in the alkaline glue mix. However, it should be recognized that as such variables as type of protein, reagent concentration, temperature, etc. are altered, reaction products can be produced which vary in viscosity and solubility in alkaline solutions, with the result that solubilities below 80% by the above test, may be exhibited, i.e., solubilities of the order of 50%, and the reaction products may still have utility in the highly alkaline glues.

The invention will be better understood from the following examples which are given by way of illustration but without any intention that the invention be limited thereto.

PREPARATION OF REACTION PRODUCTS

Example I

A blood mixture containing by weight approximately 2 parts of beef blood was concentrated to a solids content of approximately 32%. Equal parts of approximately 2.2 pounds of blood concentrate and glutaraldehyde solution containing 0.0352 pound of 25% glutaraldehyde dissolved in approximately 2.2 pounds of water were metered into a mixing chamber maintained at 105° F. and the mixture fed into a laboratory spray dryer at a rate of 46 ml. per minute, the volume of the mixing chamber providing a reaction time of 20 minutes before the mixture reached the sprayer. The concentration of glutaraldehyde based on the blood solids was 1.25%.

The mixture was spray dried while maintaining an air outlet temperature from the drying chamber of approximately 180° F.

The viscosity of this dried reaction product, as determined by the test at 60 minutes, was 70,000 centipoises.

Example II

A blood mixture containing by weight approximately 2 parts of beef blood and one part of hog blood was concentrated to a solids content of approximately 32%. Equal parts of approximately 2.2 pounds of blood concentrate and glutaraldehyde solution containing 0.056 pounds of 25% glutaraldehyde dissolved in approximately 2.2 pounds of water were metered into a mixing chamber maintained at 110° F., and the mixture fed into a laboratory spray dryer at a rate of 46 ml. per minute, the volume of the mixing chamber providing a reaction time of 4 minutes before the mixture reached the sprayer. The concentration of glutaraldehyde based on the blood solids was 2.0%.

The mixture was spray dried while maintaining an air outlet temperature from the drying chamber of approximately 180° F.

The method of determining the viscosity in alkaline solutions of the product is described hereinafter. The viscosity of the product, as determined by the test, is set forth in Table A which compiles the data for a number of the products into a single table.

Example III

A blood mixture containing by weight approximately 2 parts of beef blood and one part of hog blood was concentrated to a solids content of approximately 32%. Equal parts of approximately 2.2 pounds of blood concentrate and glutaraldehyde solution containing 0.028 pounds of 25% glutaraldehyde dissolved in approximately 2.2 pounds of water were metered into a mixing chamber maintained at 85° F. and the mixture fed into a laboratory spray dryer at a rate of 46 ml. per minute, the volume of the mixing chamber providing a reaction time of 20 minutes before the mixture reached the sprayer. The concentration of glutaraldehyde based on the blood solids was 1.0%.

The mixture was spray dried while maintaining an air outlet temperature from the drying chamber of approximately 180° F.

The method of determining the viscosity in alkaline solutions of the product is described hereinafter. The viscosity of the product, as determined by the test, is set forth in Table A which compiles the data for a number of the products into a single table.

Example IV

A blood mixture containing approximately 2 parts of beef blood and 1 part of hog blood by weight was concentrated to a solids content of approximately 32%. Equal parts of approximately 2.2 pounds of blood concentrate and glutaraldehyde solution containing 0.0352 pounds of 25% glutaraldehyde dissolved in approximately 2.2 pounds of water were metered into a mixing chamber maintained at 85° F., and the mixture fed into a laboratory spray dryer at a rate of 46 ml. per minute, the volume of the mixing chamber providing a reaction time of 20 minutes before the mixture reached the sprayer. The concentration of glutaraldehyde based on the blood solids was 1.25%.

The mixture was spray dried while maintaining an air outlet temperature from the drying chamber of approximately 180° F.

The method of determining the viscosity in alkaline solutions of the product is described hereinafter. The viscosity of the product, as determined by the test, is set forth in Table A which compiles the data for some of the products into a single table.

Example V

A concentrated blood mixture containing approximately 2 parts of beef blood and one part of hog blood by weight, evaporated to a solids content of approximately 32% was fed into a spray dryer at a temperature of 100° F. at a rate of 2.5 gallons per minute. The blood solids rate was approximately 7.28 pounds per minute. A glutaraldehyde solution in water, containing 1.45 pounds of 25% glutaraldehyde per gallon, was metered into the blood mixture at the rate of one quart per minute, equivalent to a rate of 0.0910 pounds of glutaraldehyde per minute, at a point above the spray dryer providing a reaction time of 1 to 2 seconds before the mixture reached the sprayer. The glutaraldehyde concentration based on the blood solids was 1.25%.

The mixture was spray dried while maintaining an air outlet temperature from the drying chamber of approximately 180° F.

The method of determining the viscosity in alkaline solutions of the product is described hereinafter. The viscosity of the product, as determined by the test, is set forth in Table A which compiles the data for some of the products into a single table.

Example VI

To a solution of 500 grams of a blood mixture containing approximately 2 parts of beef blood and one part of hog blood, concentrated to a solids content of approximately 32%, was added, with stirring, a solution of 8 grams of 25% glutaraldehyde dissolved in 500 grams of water. The mixture was allowed to stand at room temperature for 4 hours, after which it was warmed to 85° F. and dried in a laboratory spray dryer. The glutaraldehyde concentration based on the blood solids was 1.25%.

The mixture was spray dried while maintaining an air outlet temeprature from the drying chamber of approximately 180° F.

The viscosity of this dried reaction product, as determined by the test at 60 minutes, was 40,000 centipoises.

Example VII

To a solution of one kilogram of a blood mixture containing approximately 2 parts of beef blood and one part of hog blood, concentrated to a solids content of approximately 32% was added, with stirring, 16 grams of 25% glutaraldehyde solution dissolved in 250 ml. of water. The mixture formed a thick paste which thinned out on stirring for 5 minutes. An additional 750 ml. of water was added, the mixture was warmed to 85° F. and dried in the laboratory spray dryer. All the material was dried within 15 to 45 minutes after addition of the reagent to the blood mixture. The glutaraldehyde concentration based on the blood solids was 1.25%.

The mixture was spray dried while maintaining an air outlet temperature from the drying chamber of approximately 180° F.

The viscositsy of the reaction product, as determined by the test at 60 minutes, was 58,000 centipoises.

Example VIII

To 860 grams of a raw blood mixture containing approximately 2 parts of beef blood and one part of hog blood, with a blood solids concentration of 16.4%, was added, with stirring, 6.62 grams of 25% glutaraldehyde diluted with water to 86 grams. The mixture was kept at 75° F. for 10 minutes, after which it was dried in the laboratory spray dryer. The glutaraldehyde concentration based on blood solids was 1.20%.

The mixture was spray dried while maintaining an air outlet temperature from the drying chamber of approximately 180° F.

The viscosity of the dried reaction product, as determined by the test at 60 minutes, was 14,000 centipoises.

Example IX

A beef blood was concentrated to a solids content of approximately 35%. The concentrate was split into portions A through D. Portion A was spray dried in the spray dryer having a dryer gas outlet temperature of about 175° F. The viscosity of this dried blood, as determined by the test at 60 minutes, was 160 centipoises.

To approximately 377 pounds of portion B of the concentrate being pumped into a spray dryer at a rate of approximately 18.8 pounds per minute at 90° F. was added glutaraldehyde solution containing 0.332 pounds of 50% glutaraldehyde solution diluted with approximately 40 pounds of water. The glutaraldehyde solution was metered at a rate of 2 pounds per minute of solution into the concentrated blood being fed to the dryer at a point providing a reaction time of 6 seconds before the mixture reached the sprayer. The concentration of glutaraldehyde based on the blood solids was 0.12%.

The mixture was spray dried while maintaining an air outlet temperature from the drying chamber of approximately 175° F. The viscosity of the product, as determined by the hereinafter described test, was 800 centipoises at a time of 60 minutes.

A significant increase in viscosity is demonstrated here but, clearly, the reaction time of 6 seconds was too short for the amount of glutaraldehyde used to have a product developing a viscosity of a magnitude such as that shown to be developed by the product of Example X, etc., at the same 6 second reaction time when utilized in an alkaline solution containing 10% of reaction product. Higher concentrations of this reaction product will show a greater viscosity.

Example X

To approximately 377 pounds of portion C of the concentrate being pumped into a spray dryer at a rate of approximately 18.8 pounds per minute at 90° F. was added glutaraldehyde solution containing 0.83 pounds of 50% glutaraldehyde solution diluted with approximately 39 pounds of water. The glutaraldehyde solution was metered at a rate of 2 pounds per minute of solution into the concentrated blood being fed to the dryer at a point providing a reaction time of 6 seconds before the mixture reached the sprayer. The concentration of glutaraldehyde based on the blood solids was 0.3%.

The mixture was spray dried while maintaining an air outlet temperature from the drying chamber of approximately 175° F. The viscosity of the product, as determined by the hereinafter described test, was 2750 centipoises at a time of 60 minutes.

Example XI

To approximately 377 pounds of portion D of the concentrate being pumped into a spray dryer at a rate of approximately 18.8 pounds per minute at 90° F. was added glutaraldehyde solution containing 1.66 pounds of 50% glutaraldehyde solution diluted with approximately 38 pounds of water. The glutaraldehyde solution was metered at a rate of 2 pounds per minute of solution into the concentrated blood being fed to the dryer at a point providing a reaction time of 6 seconds before the mixture reached the sprayer. The concentration of glutaraldehyde based on the blood solids was 0.6%.

The mixture was spray dried while maintaining an air outlet temperature from the drying chamber of approximately 175° F.

The method of determining the viscosity in alkaline solutions of the product is described hereinafter. The viscosity of the product, as determined by this test, is set forth in Table A which compiles comparative data for a number of the products into a single table.

Example XII

An unevaporated hog blood containing 16.8% solids was divided into portions H and I. Portion H was spray dried in the spray dryer with an air outlet temperature of approximately 165° F. The viscosity of this dried blood, as determined by the test at 60 minutes, was 20 centipoises.

To approximately 714 pounds of portion I of the blood being pumped into a spray dryer at a rate of approximately 17.8 pounds per minute at 90° F. was added glutaraldehyde solution containing 5.3 pounds of 50% glutaraldehyde solution diluted with approximately 74 pounds of water. The glutaraldehyde solution was metered at a rate of 2 pounds per minute of solution into the blood being fed to the dryer at a point providing a reaction time of 6 seconds before the mixture reached the sprayer. The concentration of glutaraldehyde based on the blood solids was 2.2%.

The mixture was spray dried while maintaining an air outlet temperature from the drying chamber of approximately 165° F.

Viscosity in alkaline solution of this product was determined by the hereinafter described test at 8% reaction product solids instead of 10%. This viscosity was 24,000 centipoises at a time of 60 minutes.

Example XIII

A blood mixture containing by volume approximately 2 parts of beef blood and one part of hog blood was concentrated to a solids content of approximately 33%. to approximately 3,770 pounds of blood concentrate being pumped into a spray dryer at a rate of 24.5 pounds per minute at 100° F., was added a formaldehyde solution containing 25.2 pounds of 37% formaldehyde solution diluted with approximately 350 pounds of water. The formaldehyde solution was metered at a rate of approximately 2.5 pounds per minute of solution into the feed to the spray dryer at a point providing a reaction time of approximately 12 seconds before the mixture reached the sprayer. The concentration of formaldehyde based on the blood solids was 0.75%. The mixture was spray dried while maintaining an air outlet temperature of approximately 180° F. The viscosity of this product is shown in Table A.

The viscosity in alkaline solutions and the alkali solubility of the glutaraldehyde products are markedly superior to those of formaldehyde products. The solubility of the product of Example IV, determined as hereinbefore described, was 99% for the fresh product. After storage at 100° F. for 14 days, the alkali solubility of the glutaraldehyde-containing product was 92%. In contrast, the product of Example VIII had an alkali solubility of 95% when freshly prepared. After 14 days of storage at 100° F., the alkali solubility was only 44%. It can be seen from this data that the glutaraldehyde-protein reaction products have excellent storage stability.

VISCOSITY DETERMINATION

Viscosity imparted to alkaline solutions by the various products was determined as follows:

A set amount of reaction product was dispersed in sufficient water to yield a solution containing 10% blood solids after the addition of 7.5 milliliters of 1 normal sodium hydroxide per each 2.4 gram of blood solids.

The alkali was added to the dispersion with agitation and stirring continued until the mixture was homogeneous. The viscosity of the alkaline solution was measured at suitable intervals, as indicated in Table A, using a Brookfield viscosimeter having a suitable size spindle and rotating at 20 revolutions per minute.

TABLE A.—VISCOSITIES

| Time in Minutes | | 30 | 60 | 90 | 120 | 180 |
|---|---|---|---|---|---|---|
| | Percent Glutaraldehyde | | | | | |
| Example II | 2.0 | 34,000 | 34,000 | 28,000 | 25,000 | |
| Example III | 1.0 | 19,000 | 36,000 | 34,000 | 23,000 | 12,000 |
| Example IV—Fresh | 1.25 | 54,000 | 70,000 | 74,000 | 68,000 | 53,000 |
| Stored 2 Weeks at 100° F | | 76,000 | 88,000 | 63,000 | 44,000 | 41,000 |
| Example V—Fresh | 1.25 | 54,000 | 50,000 | 49,000 | 43,000 | 27,000 |
| Stored 4 Weeks at 100° F | | 55,000 | 55,000 | 50,000 | 43,000 | |
| Example XI—Fresh | 0.6 | 52,000 | 66,000 | | 48,000 | 30,000 |
| Stored 2 Weeks at 100° F | | 68,000 | 66,000 | | 50,000 | 58,000 |
| Example XIII—Fresh | ¹.75 | 70,000 | 78,000 | 76,000 | 75,000 | |
| Stored 2 Weeks at 100° F | | | | Over 200,000 | | |

¹ Formaldehyde.

In order to full understand the novel character of applicants' protein-glutaraldehyde reaction products, the characteristics which can be observed from Table A must be compared with the viscosity in alkaline solutions of other products. From Table A, it can be observed that the reaction products at 10% solids concentration maintain a high viscosity level over a period of up to 3 hours.

Ordinary soluble bloods at this solids concentration level of 10%, seldom produce alkaline solutions with viscosities greater than 200 centipoises as shown for the dried blood products of Examples IX and XII which were not reacted with glutaraldehyde. Alkaline solutions of ordinary soluble blood containing 12% to 15% solids show a greater variation in viscosity with time than do alkaline solutions of the glutaraldehyde-reacted bloods in the same viscosity range. Not only do the blood-glutaraldehyde reaction products develop a high viscosity at lower concentrations than do soluble bloods, but the viscosities are more uniform and stable. Moreover, products with higher or lower alkaline viscosity characteristics can readily be attained by appropriate modification of the reaction conditions used to produce the glutaraldehyde modified blood.

The viscosity characteristics of ordinary soluble blood are highly dependent upon the ratio of beef to hog blood in the mixture. This effect appears to be diminished upon treatment of the blood with glutaraldehyde, with the result that there is less variation in the viscosity characteristics of treated bloods when the beef-hog ratio is varied over a considerable range.

The novel products of this invention also show viscosity characteristics markedly different from those of protein-formaldehyde reaction products after storage. After only 14 days storage at 100° F., the product of Example XIII exhibits a viscosity change from 70,000 up to over 200,000 centipoises whereas the viscosity of the product of the examples shows a variation in viscosity by the described test generally of less than 20,000 centipoises, differences at least a part of which could be attributed to procedural variations.

The dry product of this invention may be processed to form a glue by dissolution in water and adding various glue making agents for the production of an adhesive having the desired properties. It may also be used in combination with soy flour, casein, phenol-formaldehye resins, etc., to form a glue.

Such agents, generally referred to as "glue conditioning chemicals," comprise, in general, alkali metal caustic such as sodium and potassium hydroxide, alkali silicates, hydrated lime, and the like.

Thermosetting resins, filler, and other suitable additives common to the glue trade may be incorporated in the glue.

The reaction product of blood protein and glutaraldehyde is mixed with glue conditioning chemicals in the desired proportions and an amount of water is added which will produce a glue having the desired consistency. Although the proportions of constituents in a given glue formulation are variable, in general, a typical plywood glue will fall within the following ranges, proportions being expressed in percentage by weight.

TABLE B

| Material: | Range, percent |
|---|---|
| Reaction product of this invention | 8 to 12 |
| Filler | 2 to 5 |
| Water | 50 to 70 |
| Alkali metal caustic | 1 to 10 |
| Alkali metal silicate | 5 to 18 |
| Hydrated lime | 1 to 10 |

In addition to the foregoing constituents, there may be included an anti-foaming agent such as pine oil. In general, from 0.5% to 1.0% of pine oil based on the finished glue mix is suitable for the purpose, but anti-foaming agent may be added in amounts required to overcome any foaming problem which may be present.

The glue mixtures, prepared as described, may be applied in the plywood fabricating operation using the conventional glue spreaders and other equipment. Their application in such equipment is particularly easy because of their stable viscosity and non-gelling characteristics. Viscosity of the glue used in plywood fabricating operations generally fall within the range of 5000 to 25,000 centipoises which viscosity is not to be confused with the viscosities shown hereinbefore which are based upon a very specific test. After applying the glue, the veneers may be assembled in the usual manner and pressed, either in a cold press or a hot press, depending upon the particular composition employed and the plywood application contemplated.

The above-detailed description of this invention is given for clearness of understanding and no limitations are to be understood therefrom, as modifications will be apparent to those skilled in the art.

We claim:

1. A composition of matter comprising a powdered product, said product being a product of reaction of blood protein and glutaraldehyde and containing an amount of glutaraldehyde constituting between 0.1% and 2.4% based upon the weight of blood solids, said product being substantially insoluble in water and having a major portion of the product soluble in an alkaline solution which is a 2.5% solids content dispersion of said product in water containing 0.1 gram of sodium hydroxide per gram of said product maintained at 70° F. and agitated for 10 minutes.

2. A composition of matter as described in claim 1 in which the blood proteins are concentrated blood proteins derived by mixing beef blood and hog blood in a ratio between 1:1 and 2.5:1 and the amount of glutaraldehyde constitutes between 1.0% and 2% based upon the weight of blood solids.

3. A composition of matter as described in claim 1 in which the blood proteins are concentrated beef blood proteins and said product contains an amount of glutaraldehyde constituting between about 0.6% and 1.0% based upon the weight of blood solids.

4. A composition of matter as described in claim 1 in which the blood proteins are concentrated hog blood proteins and said product contains an amount of glutaraldeyde constituting between about 1.2% and 2.2% based upon the weight of blood solids.

5. The method of preparing a substantially water-insoluble proteinaceous material which dissolves in alkaline solution enhancing the viscosity thereof, comprising introducing glutaraldehyde into an aqueous blood protein solution having a blood solids concentration in the range between 12% and 35%, in an amount in the range between 0.1% and 2.4% based upon the weight of the blood solids, reacting the mixture at a temperature in the range between 60° F. and 120° F. for a period in the range between two seconds and about four hours, and thereafter dehydrating the reacted mixture at temperatures less than about 200° F., whereby a reaction product is produced which is substantially insoluble in water and has a major portion thereof soluble in alkaline solution that is 2.5% solids content dispersion of said product in water containing 0.1 gram of sodium hydroxide per gram of said product maintained at 70° F. and agitated for 10 minutes.

6. The method according to claim 5 in which the blood solids being reacted are a concentrate of beef blood proteins and the glutaraldehyde is introduced in an amount in the range between 0.6% and 1.0% based upon the weight of blood solids.

7. The method according to claim 5 in which the blood solids being reacted are a concentrate of hog blood proteins and the glutaraldehyde is introduced in an amount in the range between 1.2% and 2.2% based upon the weight of blood solids.

8. The method according to claim 5 in which the blood solids are a concentrate of a mixture of beef and hog blood proteins present in a ratio in the range between 1:1 and 2.5:1 and the glutaraldehyde is introduced in an amount in the range between 1.0% and 2% based upon the weight of blood solids.

9. A glue comprising an alkali solution of a product of reaction of blood proteins and glutaraldehyde in which the protein-glutaraldehyde reaction product contains glutaraldehyde in an amount in the range between 0.1% and 2.4% based upon the weight of protein solids, said product being substantially insoluble in water due to dehydration of the reaction product at temperatures less than 200° F. and having a major portion thereof soluble in alkaline solution, the solubility in alkali solution being determined in a 2.5% solids suspension of said product in water containing 0.1 gram of sodium hydroxide per gram of said product maintained at 70° F. and agitated for ten minutes.

10. A glue according to claim 9 in which the protein-glutaraldehyde reaction product contains glutaraldehyde in an amount in the range between 0.1% and 2.0% based upon the weight of protein solids, said product being substantially insoluble in water and at least 80% soluble in alkaline solution which is a 2.5% solids content dispersion of said product in water containing 0.1 gram of sodium hydroxide per gram of said product, maintained at 70° F. and agitated for ten minutes.

No references cited.

WILLIAM H. SHORT, *Primary Examiner.*

H. E. S. CHAIN, *Assistant Examiner.*